(12) United States Patent
Singleton

(10) Patent No.: US 7,607,249 B2
(45) Date of Patent: Oct. 27, 2009

(54) RFID BRACELET AND METHOD FOR MANUFACTURING A RFID BRACELET

(75) Inventor: Robert Singleton, Plant City, FL (US)

(73) Assignee: Innovatier Inc., Lakeland, FL (US)

( * ) Notice: Subject to any disclaimer, the term of this patent is extended or adjusted under 35 U.S.C. 154(b) by 365 days.

(21) Appl. No.: 11/181,814

(22) Filed: Jul. 15, 2005

(65) Prior Publication Data

US 2007/0012771 A1  Jan. 18, 2007

(51) Int. Cl.
*A44C 5/00* (2006.01)
(52) U.S. Cl. ....................................................... 40/633
(58) Field of Classification Search .................. 40/633
See application file for complete search history.

(56) References Cited

U.S. PATENT DOCUMENTS

| | | | |
|---|---|---|---|
| 4,339,407 A | 7/1982 | Leighton | |
| 4,501,787 A | 2/1985 | Marchetti et al. | |
| 4,686,358 A | 8/1987 | Seckinger et al. | |
| 4,751,481 A | 6/1988 | Guzik et al. | |
| 4,853,692 A | 8/1989 | Wolk et al. | |
| 4,961,893 A | 10/1990 | Rose | |
| 5,115,223 A | 5/1992 | Moody | |
| 5,135,694 A | 8/1992 | Akahane et al. | |
| 5,244,840 A | 9/1993 | Kodai et al. | |
| 5,350,553 A | 9/1994 | Gläser | |
| 5,399,847 A | 3/1995 | Droz | |
| 5,416,358 A | 5/1995 | Katsunori | |
| 5,417,905 A | 5/1995 | Lemaire et al. | |
| 5,423,705 A | 6/1995 | Solomon, II | |
| 5,446,265 A | 8/1995 | McAllister | |
| 5,493,805 A | 2/1996 | Penuela et al. | |
| 5,498,388 A | 3/1996 | Kodai et al. | |
| 5,504,474 A | 4/1996 | Libman et al. | |
| 5,510,074 A | 4/1996 | Rose | |
| 5,512,887 A | 4/1996 | McAllister | |
| 5,526,006 A | 6/1996 | Akahane et al. | |
| 5,690,773 A | 11/1997 | Fidalgo et al. | |
| 5,786,626 A | 7/1998 | Brady et al. | |
| 5,883,576 A | 3/1999 | De La Huerga | |
| 5,955,021 A | 9/1999 | Tiffany, III | 264/272.11 |
| 6,025,054 A | 2/2000 | Tiffany, III | |
| 6,104,295 A | 8/2000 | Gaisser et al. | |
| 6,150,921 A | 11/2000 | Werb et al. | |
| 6,161,281 A | 12/2000 | Dando et al. | |

(Continued)

FOREIGN PATENT DOCUMENTS

AU  726884  3/2001

(Continued)

*Primary Examiner*—Lesley D Morris
*Assistant Examiner*—Shin Kim
(74) *Attorney, Agent, or Firm*—Foley & Lardner LLP

(57) ABSTRACT

A RFID bracelet and a method for manufacturing the same wherein the bracelet is composed of a bottom layer having a top surface and a bottom surface, a radio frequency identification microprocessor attached to the top surface of the bottom layer, an antenna, operably coupled to the radio frequency identification microprocessor and attached to the top surface of the bottom layer, a core layer, positioned above the bottom layer and attached to the bottom layer, the radio frequency identification microprocessor and the antenna and a top layer, positioned above the core layer and attached to the core layer.

5 Claims, 5 Drawing Sheets

U.S. PATENT DOCUMENTS

| | | |
|---|---|---|
| 6,206,291 B1 | 3/2001 | Droz |
| 6,215,401 B1 | 4/2001 | Brady et al. |
| 6,241,153 B1 | 6/2001 | Tiffany, III ................. 235/488 |
| 6,255,951 B1 | 7/2001 | De La Huerga |
| 6,256,873 B1 | 7/2001 | Tiffany, III ................. 29/827 |
| 6,262,692 B1 | 7/2001 | Babb |
| 6,317,102 B1 | 11/2001 | Stambeck |
| 6,346,886 B1 | 2/2002 | De La Huerga |
| 6,353,406 B1 | 3/2002 | Lanzl et al. |
| 6,404,643 B1 | 6/2002 | Chung |
| 6,483,427 B1 | 11/2002 | Werb |
| 6,608,561 B2 | 8/2003 | Lawler, Jr. et al. |
| 6,639,557 B2 | 10/2003 | Kamei et al. |
| 6,693,543 B1 | 2/2004 | Stephenson et al. |
| 6,812,824 B1 | 11/2004 | Goldinger et al. |
| 6,888,502 B2 * | 5/2005 | Beigel et al. ........ 343/700 MS |
| 6,894,615 B2 | 5/2005 | Look |
| 6,971,200 B2 * | 12/2005 | Valenti, Jr. .................. 40/633 |
| 7,197,842 B2 * | 4/2007 | Ali .............................. 40/633 |
| 7,225,537 B2 | 6/2007 | Reed |
| 7,237,724 B2 | 7/2007 | Singleton |
| 7,240,446 B2 * | 7/2007 | Bekker ......................... 40/633 |
| 2002/0084904 A1 | 7/2002 | De La Huerga |
| 2002/0179721 A1 | 12/2002 | Elbaz et al. |
| 2003/0217210 A1 | 11/2003 | Carau |
| 2004/0031856 A1 | 2/2004 | Atsmon et al. |
| 2004/0262782 A1 | 12/2004 | Ellis et al. |
| 2005/0168339 A1 * | 8/2005 | Arai et al. ................ 340/572.8 |
| 2005/0276934 A1 | 12/2005 | Fukui et al. |
| 2006/0086013 A1 * | 4/2006 | Stegman et al. ............. 40/27.5 |
| 2006/0145864 A1 * | 7/2006 | Jacober et al. .......... 340/572.8 |
| 2006/0162156 A1 | 7/2006 | Reed .......................... 29/841 |
| 2006/0226240 A1 | 10/2006 | Singleton |
| 2007/0235548 A1 | 10/2007 | Singleton |
| 2007/0290048 A1 | 12/2007 | Singleton et al. |

FOREIGN PATENT DOCUMENTS

| | | |
|---|---|---|
| CA | 2289728 | 6/2001 |
| EP | 0 488 574 B1 | 6/1992 |
| EP | 488574 A2 | 6/1992 |
| EP | 0 350 179 B1 | 1/1994 |
| EP | 0 669 597 A1 | 8/1995 |
| EP | 1 308 874 A | 5/2003 |
| EP | 1 780 897 A | 5/2007 |
| GB | 2 020 861 A | 11/1979 |
| JP | 2001-266823 A | 9/2001 |
| WO | WO 01/18981 | 3/2001 |
| WO | WO 02/076717 A2 | 10/2002 |
| WO | WO 2006/080929 | 8/2006 |
| WO | WO 2006/080929 | 8/2006 |
| WO | WO 2006/101493 | 9/2006 |
| WO | WO 2006/101493 | 9/2006 |
| WO | WO 2006/107968 A1 | 10/2006 |
| WO | WO 2007/011514 A2 | 1/2007 |
| WO | WO 2007/126748 A2 | 11/2007 |
| WO | WO 2007/149148 A1 | 12/2007 |

* cited by examiner

RFID BRACELET AND METHOD FOR MANUFACTURING A RFID BRACELET

BACKGROUND OF THE INVENTION

Bracelets have numerous applications from functional to fashionable. For example, a bracelet may be used as a ticket to indicate that the wearer of the bracelet is entitled to admittance to a venue or show. A bracelet is ideal in cases where vigorous physical activity is involved or where it is burdensome for a patron to keep up with a ticket, such as a water park or concert. Radio frequency identification ("RFID") chips may be incorporated into bracelets to give them increased functionality. Generally, RFID chips are used for tracking products. An item possessing a RFID chip may be tracked by a network system. Because of the RFID, the network system is able to identify the location of the RFID chip and thus the wearer of the bracelet.

Generally, in bracelets possessing an RFID chip, a pressure sensitive adhesive is used to bind two substrates together, where one of the substrates contains the RFID chip. This construction provides little or no protection for the RFID chip. Specifically, conventional bracelets employ the use of thin substrates that are capable of absorbing only small amounts of shock. Further, the materials used in conventional bracelets having an RFID chip are thin and have a tendency to separate and lose continuity when stretched. Therefore, a bracelet and method for constructing the bracelet is needed that is capable of producing an RFID bracelet for absorbing increased amounts of shock, protecting RFID circuitry and has possesses increased tensile strength.

SUMMARY OF THE INVENTION

One embodiment of the invention relates to a bracelet comprising a bottom layer having a top surface and a bottom surface, a radio frequency identification microprocessor attached to the top surface of the bottom layer, an antenna, operably coupled to the radio frequency identification microprocessor and attached to the top surface of the bottom layer, a core layer, positioned above the bottom layer and attached to the bottom layer, the radio frequency identification microprocessor and the antenna and a top layer, positioned above the core layer and attached to the core layer.

According to another embodiment of the invention, the bracelet further comprises a battery operably coupled to the radio frequency identification microprocessor.

According to yet another embodiment of the invention, a method for manufacturing a bracelet includes providing a bottom layer having a top surface and a bottom surface, attaching a radio frequency identification microprocessor to the top surface of the bottom layer, forming an antenna on the top surface of the bottom layer, whereby the antenna is operably coupled to the radio frequency identification microprocessor, forming a disabling tail on the top surface of the bottom layer, whereby the disabling tail is operably coupled to the antenna, loading the bottom layer into an injection molding apparatus, loading the top layer, positioned above the top surface of the bottom layer, into the injection molding apparatus and injecting thermosetting polymeric material between the top layer and the top surface of the bottom layer.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 1:
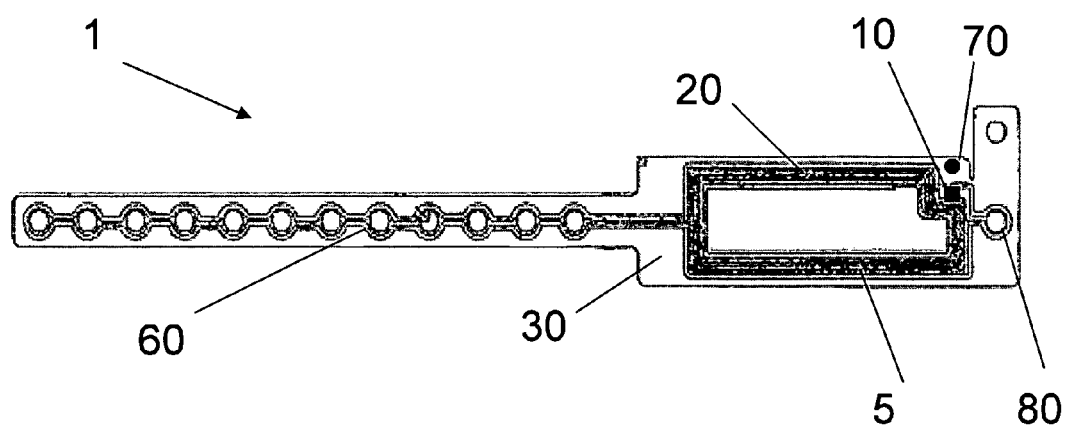
FIG. 1 is a top cross sectional view of an RFID bracelet according to one embodiment of the invention.
Figure 2:
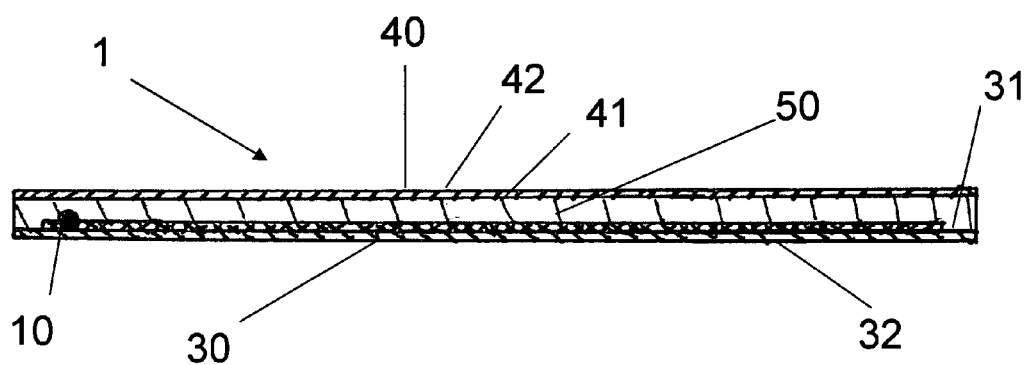
FIG. 2 is a side cross sectional view of an RFID bracelet according to another embodiment of the invention.

According to one embodiment of the present invention, as shown in FIGS. 1 and 2, the bracelet 1 comprises a radio frequency identification ("RFID") microprocessor 10, an antenna 20, a bottom layer 30, a top layer 40 and a core layer 50. Further, the bracelet 1 includes extremity loops 60 for fastening the bracelet 1 to the wrist of a wearer.

The bottom layer 30 has a top surface 31 and a bottom surface 32. The bottom layer 30 is comprised of any known conventional plastic material that does not conduct electricity. For example, the bottom layer 30 may be comprised of PVC, nylon, polyester, polypropylene, polycarbonate or teslin. The bottom surface 32 of the bottom layer 30 is configured to display writing or any type of identify marks. The top surface 31 of the bottom layer 30 may be comprised of a plastic compound that is suitable for receiving conductive ink. As shown in FIG. 1 and described below, the top surface 31 of the bottom layer 30 is configured to receive and vertically stabilize a plurality of circuit components.

As described above, a plurality of circuit components may be attached to the top surface 31 of the bottom layer 30. The plurality of circuit components can be positioned anywhere on the top surface 31 of the bottom layer 30 as desired. The purpose and design functionality of the bracelet 1 will dictate the position of the circuit components. Functionality will also dictate what types of circuit components are included within the bracelet 1. For example purposes only, the bracelet 1 could be populated with a battery 70, an antenna 20, and a RFID microprocessor 10. Further, additional circuit components may include but are not limited to LEDs, flexible displays and emulators.

According to one embodiment of the present invention, the top surface 31 of the bottom layer 30 is configured to receive a RFID microprocessor 10, a battery 70 and an antenna 20

(shown in FIG. 1). The RFID microprocessor 10 may be anyone of several known RFID processors. For example, a Phillips SL2 ICS20 chip may be used as the RFID microprocessor 10. In one embodiment of the invention, a FCP2 flip-chip package is used as the RFID microprocessor 10. The RFID microprocessor 10 is operably connected to a battery 70 and an antenna 20 via circuit traces 5.

As shown in FIG. 1, according to one embodiment of the invention, the antenna 20 is deposited on the top surface 31 of the bottom layer 30. The antenna 20 may be may be comprised of anyone of a number of materials. For example, the antenna 20 may be comprised of solid copper wire. According to another embodiment of the present invention, the antenna 20 is printed on the top surface 31 of the bottom layer 30 with conductive ink. As show in FIG. 1, a disabling tail 80 is also operably connected to the antenna 20.

Figure 3:
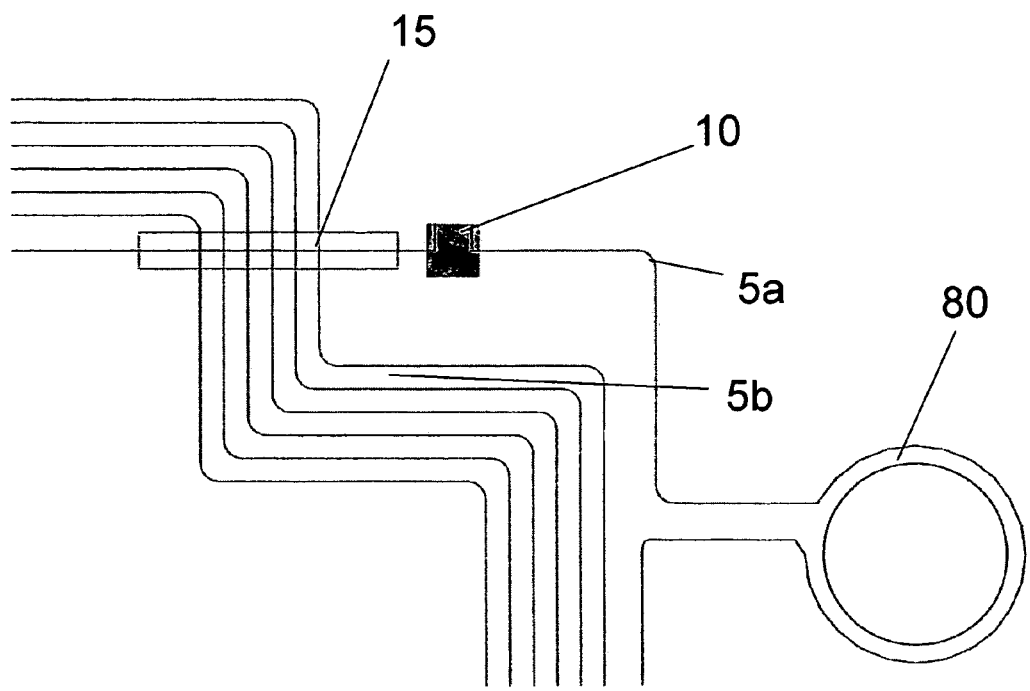
FIG. 3 is an enlarged view of an RFID bracelet according to one embodiment of the invention.

According to one embodiment of the invention, as shown in FIG. 3, two layers of conductive ink form circuit traces 5 on the top surface 31 of the bottom layer 30. A first layer of conductive ink 5a forms the main loops of the antenna 20 and encircles the disabling tail 80. The first layer of conductive ink 5a also extends around the loops 60 of the bracelet 1. The second layer of conductive ink 5b is applied after the first layer of conductive ink. As shown in FIG. 3, a dielectric coating 15 is positioned on top of the first conductive ink layer 5a where the second layer of conductive ink 5b intersects with the first layer of conductive ink 5a.

As shown in FIG. 2, the top layer 40 has a bottom surface 41 and a top surface 42. The top layer 40 is comprised of any known conventional plastic material that does not conduct electricity. For example, the top layer 40 may be comprised of PVC, nylon, polyester, polypropylene, polycarbonate or teslin. The top surface 42 of the top layer 40 is configured to display writing or any type of identify marks. The bottom surface 41 is configured to come into contact with a core layer 50.

The core layer 50 is positioned between the top layer 40 and bottom layer 30 and is in continuous contact with the bottom surface 41 of the top layer 40 and the top surface 31 of the bottom layer 30. The core layer 50 is comprised of material configured to stabilize the circuit components positioned on the top surface 31 of the bottom layer 30 in the vertical and horizontal directions. In addition, the core layer 50 protects the circuit components from physical damage. The thickness of the core layer 50 is in the range of 0.005-0.100 inches. Preferably, the core layer 50 is 50% thicker than the thickness of the circuit components present on the top surface 31 of the bottom layer 30.

According to one embodiment of the invention, the core layer 50 is comprised of anyone of a number of thermosetting polymeric materials. Due to its bonding and adhesive properties, a core thermosetting polymeric layer 50 integrates the bottom layer 30 with the top layer 40 and the remaining components to form a bracelet 1.

The preferred thermosetting materials are polyurethane, epoxy and unsaturated polyester polymeric materials. Specifically, polyurethanes made by condensation reactions of isocyanate and a polyol derived from propylene oxide or trichlorobutylene oxide are preferred. Of the various polyesters that can be used, those that can be further characterized as being "ethylenic unsaturated" are particularly preferred because of their ability to be cross linked through their double bonds with compatible monomers (also containing ethylene unsaturation) and with the materials out of which the top 40 and bottom 30 layers are made. The more preferred epoxy materials for use in the practice of this invention will be those made from epichlorohydrin and bisphenol A, epichlorohydrin, and an aliphatic polyol (such as glycerol). They are particularly preferred because of their ability to bond with some of the more preferred materials (e.g., polyvinyl chloride) out of which the top 40 and bottom 30 layers may be made.

A method for manufacturing a RFID bracelet 1 according to the present invention will now be described.

First, a bottom layer 30 is provided. The bottom layer 30 has a top surface 31 and a bottom surface 32. Circuit traces 5 are present on the top surface 31 of the bottom layer 30. Next, a plurality of circuit components are placed onto the top surface 31 of the bottom layer 30 and electrically connected to the circuit traces 5.

Figure 4:
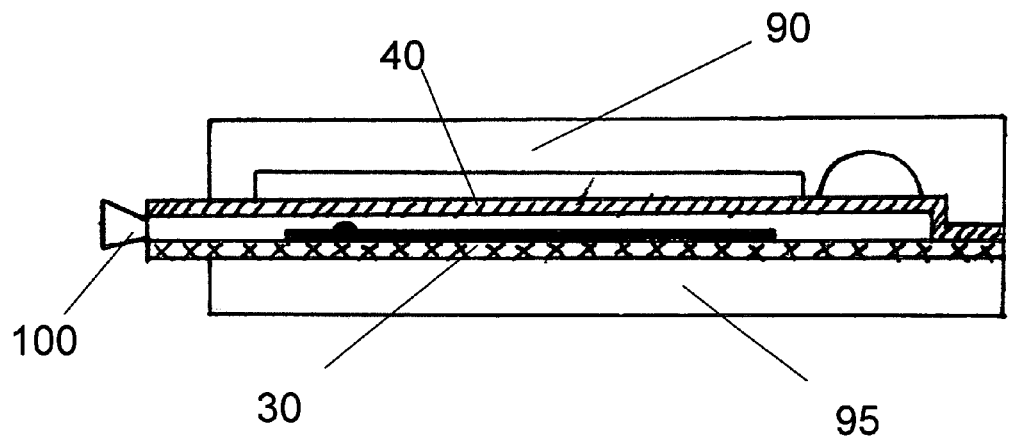
FIG. 4 is a side cross sectional view of an RFID bracelet in an injection molding apparatus prior to injection of a core layer.

As shown in FIG. 4, the bottom layer 30 is then loaded as one complete sheet into an injection molding apparatus. A top surface 40 is placed into the injection molding apparatus and positioned such that the top layer 40 is above the top surface 31 of the bottom layer 30. Specifically, the injection molding apparatus may be a reaction injection molding machine (which is often individually referred to as "RIM"). These machines are associated with a top mold shell 90 and a bottom mold shell 95 that are capable of performing cold, low pressure, forming operations on at least one of the sheets of polymeric material (e.g., PVC) that make up the top 40 and bottom 30 layers. Such top and bottom mold shells 90, 95 cooperate in ways that are well known to those skilled in the polymeric material molding arts.

Figure 5:
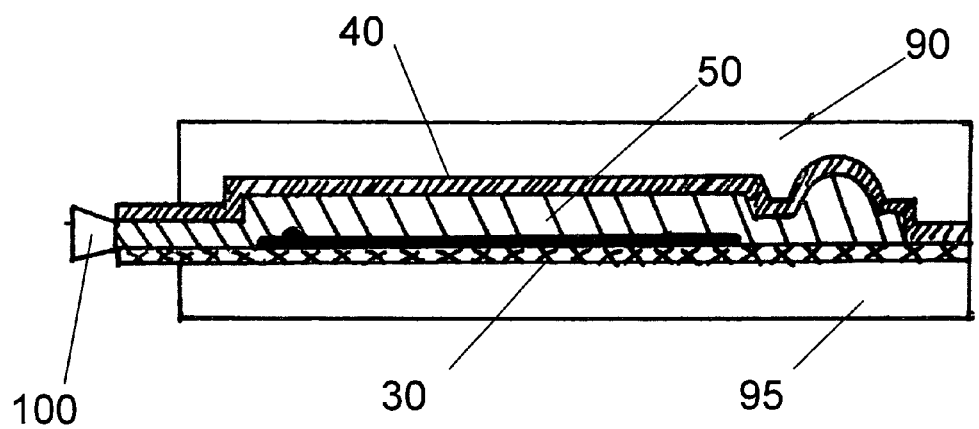
FIG. 5 is a cross sectional view of an RFID bracelet in an injection molding apparatus after injection of a core layer.

The injection molding apparatus then injects thermosetting polymeric material via a nozzle 100 (shown in FIGS. 4 and 5) between the top layer 40 and the bottom layer 30 forming the core layer 50 from thermosetting polymeric material.

Cold, low pressure forming conditions generally mean forming conditions wherein the temperature of the core layer 50 consisting of thermosetting polymeric material, is less than the heat distortion temperature of the top 40 and bottom 30 layers, and the pressure is less than about 500 psi. Preferably, the cold forming temperatures will be at least 10° F. less than the heat distortion temperature of the top 40 and bottom 30 overlays. The heat distortion temperature of many polyvinyl chloride (PVC) materials is about 230 degrees F.

Preferably, gates are employed that are tapered down from a relatively wide inflow area to a relatively narrow core region that ends at or near the leading edge(s) of the bracelet 1 body being formed. Most preferably, these gates will narrow down from a relatively wide diameter (e.g., from about 5 to about 10 mm) injection port that is in fluid connection with the thermosetting material-supplying runner, to a relatively thin diameter (e.g., 0.10 mm) gate/bracelet edge where the gate feeds the thermosetting material into the void space which ultimately becomes the center or core of the finished bracelet 1. Gates that taper from an initial diameter of about 7.0 millimeters down to a minimum diameter of about 0.13 mm will produce especially good results under the preferred cold, low-pressure injection conditions.

Another optional feature that can be used is the use of mold shells that have one or more receptacles for receiving "excess" polymeric material that may be purposely injected into the void space between the top 40 and bottom 30 layers in order to expunge any air and/or other gases (e.g., those gases formed by the exothermic chemical reactions that occur when the ingredients used to formulate most polymeric thermoset materials are mixed together) from said void space. These thermoset ingredients are preferably mixed just prior to (e.g., about 30 seconds before) their injection into the void space.

Once the core layer 50 has been injected, the molded structure is removed from the injection molding apparatus.

Figure 6:
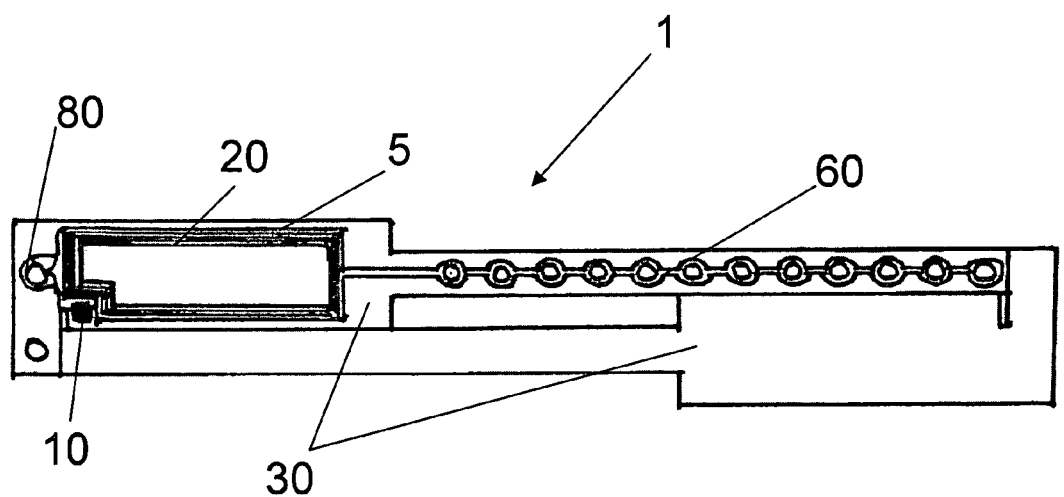
FIG. 6 is a top cross sectional view of two RFID bracelets according to one embodiment of the invention.

According to one embodiment of the invention, several bracelets 1 are cut out of one molded sheet. FIG. 6 depicts several bracelets 1 formed on one sheet. The finished bracelets 1 are then removed from the excess polymeric material (e.g., by trimming) and cut to certain prescribed sizes. The trimming process may also remove the excess material in one cutting/trimming operation. It also will be well appreciated by those skilled in this art that the molding devices used to make such bracelets 1 in commercial production operations will most preferably have mold shells having multiple cavities (e.g., 2, 4, 6, 8, etc.) for making several such bracelets 1 simultaneously.

The present invention has several advantages including a cost effective manner to produce one or more RFID bracelets 1. The core layer 50 provides greater protection to circuit components inside the bracelet 1 during manufacturing and wear which in turn lowers production costs and raises production output. Moreover, the method of the present invention can be easily adapted to produce multiple bracelets 1 at once.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A method for manufacturing a bracelet comprising:
   providing a bottom layer having a top surface and a bottom surface;
   attaching a radio frequency identification microprocessor to the top surface of the bottom layer;
   forming an antenna on the top surface of the bottom layer whereby the antenna is operably coupled to the radio frequency identification microprocessor;
   forming a disabling tail on the top surface of the bottom layer, whereby the disabling tail is operably coupled to the antenna;
   loading the bottom layer into an injection molding apparatus;
   loading the top layer, positioned above the top surface of the bottom layer, into the injection molding apparatus; and
   injecting thermosetting polymeric material between the top layer and the top surface of the bottom layer.

2. The method of claim 1, further comprising forming a plurality of extremity loops on the bracelet for fastening the bracelet to the wrist of a wearer.

3. The method of claim 1, wherein a plurality of bracelets are formed from one bottom layer.

4. The method of claim 3, further comprising: removing the injected top and bottom layers from the injection molding apparatus and cutting out the plurality of bracelets.

5. A method for manufacturing a bracelet comprising:
   providing a bottom layer having a top surface and a bottom surface;
   attaching a radio frequency identification microprocessor to the top surface of the bottom layer;
   attaching a battery to the top surface of the bottom layer, so that it provides power to the radio frequency identification microprocessor;
   forming an antenna on the top surface of the bottom layer whereby the antenna is operably coupled to the radio frequency identification microprocessor;
   forming a disabling tail on the top surface of the bottom layer, whereby the disabling tail is operably coupled to the antenna;
   loading the bottom layer into an injection molding apparatus;
   loading the top layer, positioned above the top surface of the bottom layer, into the injection molding apparatus; and
   injecting thermosetting polymeric material between the top layer and the top surface of the bottom layer.

* * * * *